United States Patent
Toyoda et al.

(10) Patent No.: US 11,323,286 B2
(45) Date of Patent: May 3, 2022

(54) COMMUNICATION SYSTEM (71) Applicant: YAZAKI CORPORATION, Tokyo (JP)

(72) Inventors: Ryoma Toyoda, Makinohara (JP); Kunihiko Yamada, Makinohara (JP); Masashi Tsukamoto, Makinohara (JP); Junki Ema, Makinohara (JP); Masaaki Suguro, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/177,188

(22) Filed: Feb. 16, 2021

(65) Prior Publication Data
US 2021/0258189 A1 Aug. 19, 2021

(30) Foreign Application Priority Data
Feb. 17, 2020 (JP) .............................. JP2020-024613

(51) Int. Cl.
*H04L 12/40* (2006.01)
*H04L 45/00* (2022.01)

(52) U.S. Cl.
CPC .. *H04L 12/40182* (2013.01); *H04L 12/40189* (2013.01); *H04L 12/40202* (2013.01); *H04L 45/22* (2013.01); *H04L 2012/40215* (2013.01)

(58) Field of Classification Search
CPC ......... H04L 12/40182; H04L 12/40189; H04L 12/40202; H04L 12/40; H04L 12/40176; H04L 2012/40215; H04L 45/22; B60R 16/023; B60R 16/03; G06F 11/0751; G06F 11/2007
See application file for complete search history.

(56) References Cited

U.S. PATENT DOCUMENTS

| 4,124,271 A * | 11/1978 | Green | G02B 6/3508 |
| | | | 385/21 |
| 2002/0114031 A1* | 8/2002 | Yamada | H04J 14/0227 |
| | | | 398/3 |
| 2003/0043750 A1 | 3/2003 | Remboski et al. | |
| 2003/0043779 A1 | 3/2003 | Remboski et al. | |
| 2008/0201491 A1 | 8/2008 | Fuhrmann | |
| 2018/0097721 A1 | 4/2018 | Matsui et al. | |
| 2020/0125858 A1* | 4/2020 | Bauer | G06V 20/56 |

FOREIGN PATENT DOCUMENTS

JP 2019-137394 A 8/2019

* cited by examiner

*Primary Examiner* — Stephen J Clawson
(74) *Attorney, Agent, or Firm* — Kenealy Vaidya LLP (57) ABSTRACT

A plurality of zones is formed in a communication network on the vehicle, and a communication path in a loop form is formed in each zone by zone trunk lines and a backup line. The backup line is connected by a switch only at the time of disconnection so that the loop is not closed. At the time of disconnection detection, an instruction is automatically given to rewrite content of routing maps on zone ECUs and a central gateway. Since each node preferentially selects a communication path that bypasses a disconnection portion from the start of communication by rewriting the content of the routing maps, it is possible to avoid an increase in communication delay. An inter-zone backup line connecting a plurality of zones is provided to enable the use of a new path across the plurality of zones at the time of disconnection.

4 Claims, 8 Drawing Sheets

COMMUNICATION SYSTEM

CROSS REFERENCE TO RELATED APPLICATIONS

This application is based on and claims priority from Japanese patent application No. 2020-024613 filed on Feb. 17, 2020, the entire contents of which are incorporated herein by reference.

TECHNICAL FIELD

The present invention relates to, for example, a communication system that can be used for communication between a plurality of electrical components via a transmission path of a wire harness on a vehicle, and particularly relates to a technique for coping with a failure such as disconnection of a communication path.

BACKGROUND ART

For example, as disclosed in JP-A-2019-137394, a technique for simplifying a wiring path of a wire harness on a vehicle and shortening an electric wire length is applied to a wiring structure of wire harness. Further, it is disclosed that the technique is implemented with: a power supply that supplies power in the vehicle; a plurality of power supply distributors; a power supply trunk line that is wired between the plurality of power supply distributors along a front-rear direction of the vehicle or a width direction of the vehicle; a power supply line that is wired between the power supply and at least one of the plurality of power supply distributors; a plurality of communication control parts that control the plurality of power supply distributors; and a communication trunk line that is wired between the plurality of communication control parts.

Further, as illustrated in FIG. 8 and disclosed in [0033] of JP-A-2019-137394, one loop is formed including a first communication control part 21a, a first communication trunk line 22a, a second communication control part 21b, a second communication trunk line 22b, a third communication control part 21c, a third communication trunk line 22c, a fourth communication control part 21d, and a fourth communication trunk line 22d. Accordingly, when a communication control part detects disconnection of a communication trunk line connected to the communication control part, the communication control part cuts off electrical connection with the disconnected communication trunk line. Then, a current can be supplied to the communication control part via a communication trunk line of another path. For example, when the second communication control part 21b detects disconnection of the first communication trunk line 22a, electrical connection with the first communication trunk line 22a can be cut off and a current from the second communication trunk line 22b can be supplied to the second communication control part 21b. By forming a loop with a plurality of communication control parts and communication trunk lines in this manner, malfunction and failure of each part of the vehicle can be effectively prevented.

SUMMARY OF INVENTION

In a case where a communication path is formed in a loop type as illustrated in FIG. 8 of JP-A-2019-137394, even when a failure such as disconnection occurs in a part of the communication path, it is possible to secure a communication path by using another path in which no failure occurs, and thus it is possible to improve communication reliability.

However, in a case where a bus type communication network such as a controller area network (CAN) is used in a typical on-vehicle system in the related art, an initial communication path is determined according to a routing map determined in advance. But when a plurality of communication paths is connected in a loop form in order to back up for disconnection, a problem occurs that the routing map cannot be created.

Even if the on-vehicle system has a plurality of communication paths for backup, when it is found that communication via a certain communication path is not possible due to disconnection or the like, it is necessary to search for and switch to another communication path that can be used. Therefore, there is possibility that a relatively long time is required before normal communication can be started.

In addition, since the system on the vehicle has a large number of electronic devices, and many of the electronic devices are mounted in a state of being distributed at various places on a vehicle body, a problem occurs that a path length of the wire harness used for communication is long. Furthermore, for example, when damage occurs in the vehicle body due to a traffic accident or the like, it is essential to consider possibility that disconnection of the wire harness occurs and that communication cannot be performed between the plurality of electronic devices.

A communication system according to an embodiment is capable of dividing a space or characteristics on a vehicle into a plurality of zones and managing each zone independently, and when a failure such as disconnection of a communication path occurs, enabling use of another communication path that is not disconnected, and further reducing communication delay.

A communication system according to an embodiment has a plurality of communication lines each formed in a loop form and in which a transmission path having a coupling connector provided at each of a plurality of connection positions on the communication line is formed in each of a plurality of zones. The communication system includes:

a plurality of zone management parts each of which manages a communication path of one of the plurality of zones;

a central management part that manages all communication paths in the plurality of zones in cooperation with the plurality of zone management parts;

one or more path switches that are provided for each of the plurality of zones;

two or more disconnection detection parts that are provided for each of the plurality of zones; and a communication path control part.

The path switch is controllable to cut off a part of the communication line in a steady state is provided inside or near the plurality of the coupling connectors, the disconnection detection part that detects presence or absence of disconnection in one or more paths included in the communication line for each of the plurality of zones is provided inside or near the plurality of the coupling connectors, each of the plurality of zone management parts and the central management part holds a routing map for controlling the communication path, and when the disconnection detection part detects presence of disconnection, the communication path control part switches one or a plurality of the path switches to a connected state, and changes content of the routing map to enable use of a path passing through the path switch.

DESCRIPTION OF EMBODIMENTS

Specific embodiments according to the present invention will be described below with reference to the drawings.

First Embodiment

<Outline of Configuration of Communication System>

Figure 1A:
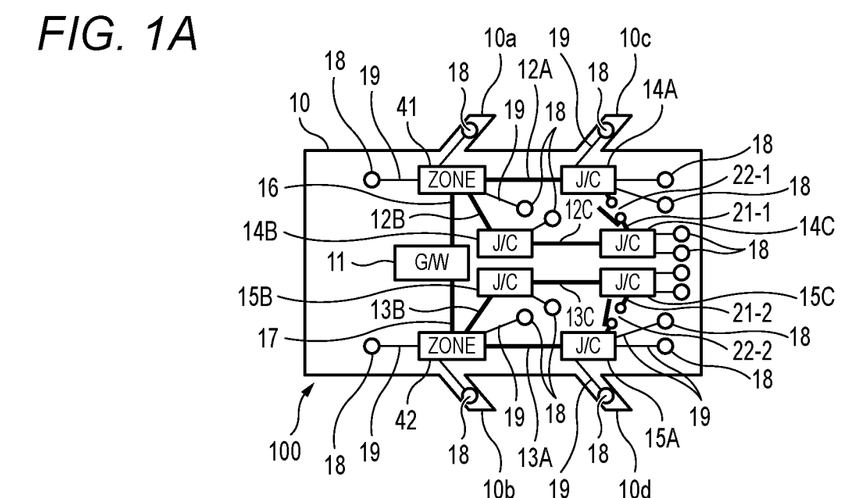
FIG. 1A is a block diagram illustrating a configuration of a communication system according to a first embodiment that is mounted on a vehicle, specifically illustrating the configuration in a normal state.
Figure 1B:
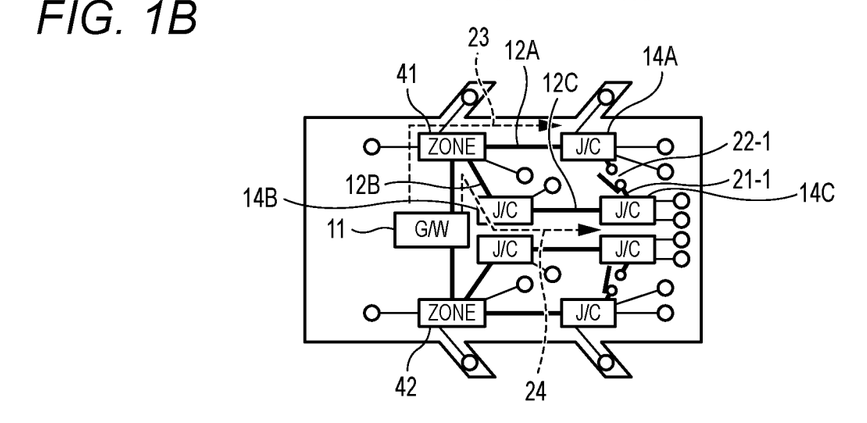
FIG. 1B is a block diagram illustrating the configuration of the communication system according to the first embodiment that is mounted on a vehicle, specifically illustrating a communication path in a normal state.
Figure 1C:
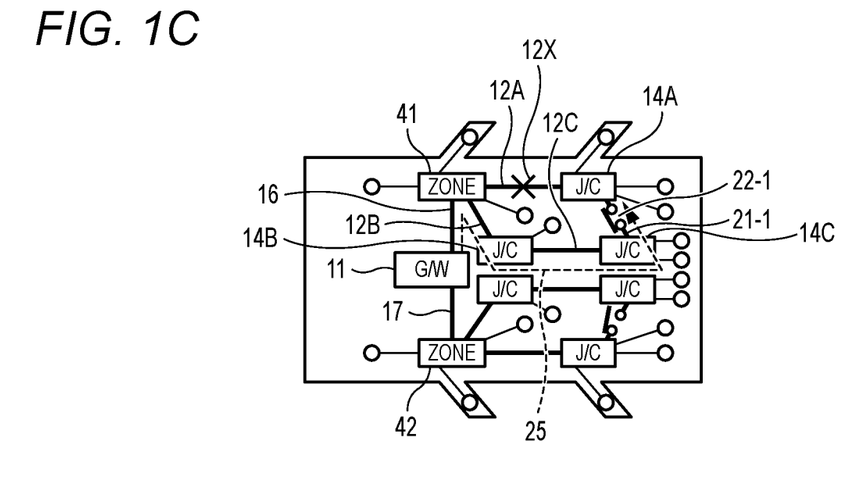
FIG. 1C is a block diagram illustrating the configuration of the communication system according to the first embodiment that is mounted on a vehicle, specifically illustrating the communication path at the time when disconnection occurs.

An outline of a configuration of a communication system 100 according to an embodiment of the present invention is illustrated in FIGS. 1A, 1B, and 1C. FIG. 1A illustrates a configuration in a normal state, FIG. 1B illustrates a communication path in a normal state, and FIG. 1C illustrates the communication path at the time when disconnection occurs.

It is assumed that the communication system 100 of the present embodiment is used in a state of being mounted on a vehicle such as an automobile. FIGS. 1A, 1B, and 1C illustrate a layout of components in a plane as viewing a vehicle body 10 from above. In FIGS. 1A, 1B, and 1C, a left side represents a front side of the vehicle body 10 and a right side represents a rear side of the vehicle body 10. Four doors 10a, 10b, 10c, and 10d are arranged on left and right sides of the vehicle body 10.

As illustrated in FIG. 1A, various types of electrical components 18 are installed at a larger number at various places on the vehicle body 10. Each of the electrical components 18 includes an electronic control unit (ECU) having a communication function of the CAN standard, and is capable of performing wired communication via the communication system 100.

A communication network of the communication system 100 illustrated in FIG. 1A has a plurality of independent zones and a high-order communication network connecting the plurality of independent zones. In the example of FIG. 1A, one zone is formed in a space on the right side of the vehicle body 10, and another zone is formed in a space on the left side. The zone on the right side is provided with a zone ECU 41 that manages this zone, and the zone on the left side is provided with a zone ECU 42 that manages this zone. A plurality of zones may be formed based on different characteristics instead of space, such as types of electrical components serving as control targets, required communication speeds, and functional groups on the vehicle.

An upstream side of the zone ECU 41 is connected to a central gateway (GW) 11 via a high-order communication bus 16. An upstream side of the zone ECU 42 is connected to the central gateway 11 via a high-order communication bus 17. Each of the zone ECUs 41 and 42 has a gateway function for controlling an in-zone communication path on a downstream side, and holds a routing map indicating a path that is assigned in advance for each communication node. The central gateway 11 is a high-order ECU having a function of controlling all the communication paths in a plurality of zones, and holds a routing map for managing all the communication paths. The high-order communication buses 16 and 17 are transmission paths corresponding to, for example, the CAN communication standard, and the central gateway 11 and each of the zone ECUs 41 and 42 incorporate an appropriate interface for communication therebetween.

On a downstream side of the zone ECU 41, zone trunk lines 12A, 12B, 12C, and a backup line 21-1 are connected so as to form one loop. A switch 22-1 is connected in the middle of a path of the backup line 21-1. The switch 22-1 is a normally-off type switch that opens a circuit in a steady state, and is, for example, a switch capable of on-off control, such as a relay. Therefore, in the steady state, a part of the loop of the in-zone communication path is opened, and the backup line 21-1 is disconnected from a CAN bus.

A joint connector 14A is provided at an end of the zone trunk line 12A, a joint connector 14B is provided in the middle of the zone trunk lines 12B and 12C, and a joint connector 14C is provided at an end of the zone trunk line 12C.

Each of the zone trunk lines 12A, 12B, 12C, and the backup line 21-1 is a communication transmission path corresponding to the CAN communication standard, and includes, for example, two communication lines, a power supply line, and a ground line. It is needless to say that the power supply line and the ground line may be prepared separately. In addition, another communication standard such as a CAN flexible data rate (CANFD) using a bus type network similar to a CAN may be adopted instead of the CAN standard.

One or a plurality of branch lines 19 is connected to respective positions of the zone ECU 41 and the joint connectors 14A, 14B, and 14C, and electrical components 18 are connected to ends of the branch lines 19 respectively. Each branch line 19 includes two communication lines, a power supply line, and a ground line.

Each of the joint connectors 14A, 14B, and 14C is an intermediate component for physically and electrically coupling an in-zone trunk line to a downstream branch line 19, and the zone ECU 41 also has a function of a joint connector. In addition, among the joint connectors 14A, 14B, and 14C, at least the joint connectors 14A and 14C at path end positions have a disconnection detecting function as will be described later.

On a downstream side of the zone ECU 42, zone trunk lines 13A, 13B, 13C, and a backup line 21-2 are connected so as to form one loop. A switch 22-2 is connected in the middle of a path of the backup line 21-2. The switch 22-2 is a normally-off type switch that opens a circuit in a steady state, and is, for example, a switch capable of on-off control, such as a relay. Therefore, in the steady state, a part of the loop of the in-zone communication path is opened, and the backup line 21-2 is in a disconnected state.

A joint connector 15A is provided at an end of the zone trunk line 13A, a joint connector 15B is provided in the middle of the zone trunk lines 13B and 13C, and a joint connector 15C is provided at an end of the zone trunk line 13C.

Each of the zone trunk lines 13A, 13B, 13C, and the backup line 21-2 is a communication transmission path corresponding to the CAN communication standard, and includes, for example, two communication lines, a power supply line, and a ground line. It is needless to say that the power supply line and the ground line may be prepared separately. In addition, another communication standard such as CANFD using a bus type network similar to the CAN may be adopted instead of the CAN standard.

One or a plurality of branch lines 19 are connected to respective positions of the zone ECU 42 and the joint connectors 15A, 15B, and 15C, and the electrical components 18 are connected to ends of the branch lines 19 respectively. That is, each of the joint connectors 15A, 15B, and 15C is a component for coupling an in-zone trunk line to a downstream branch line 19, and the zone ECU 42 also has a function of a joint connector. In addition, among the joint connectors 15A, 15B, and 15C, at least the paths 15A and 15C at path end positions have a disconnection detecting function as will be described later.

Each of the zone ECUs 41 and 42 is an electronic control unit having a plurality of communication interfaces corresponding to the CAN standard, a routing map, and a control part. Communication paths for communication of the electrical components 18 and the like in the zone are usually determined based on content of the routing maps in the zone ECUs 41 and 42 and the central gateway 11.

The content assigned to a routing map indicates communication paths to the electrical components 18 via the central gateway 11, the zone ECUs 41 and 42, the zone trunk lines 12A to 12C and 13A to 13C, the joint connectors 14A to 14C and 15A to 15C, the branch lines 19, and the like, and a path is separately assigned to each communication node.

For example, in the zone on the right side of the vehicle body 10, in a state where no failure such as disconnection occurs in the zone trunk lines 12A to 12C, communication using communication paths 23 and 24 as illustrated in FIG. 1B can be performed. For example, when communication is to be performed between the electrical component 18, which is connected to the end of the zone trunk line 12A via the joint connector 14A and the branch line 19, and the electrical component 18, which is connected to the end of the zone trunk line 12C via the joint connector 14C and the branch line 19, the communication can be performed using the communication paths 23 and 24. That is, the communication path 23 passing through the central gateway 11, the zone ECU 41, the zone trunk line 12A, and the joint connector 14, and the communication path 24 passing through the central gateway 11, the zone ECU 41, the zone trunk lines 12B and 12C, and the joint connectors 14B and 14C can be used.

Since information on such available communication paths is usually determined in advance and registered in the routing maps on the central gateway 11 and the zone ECUs 41 and 42, the communication path can be determined immediately based on the routing maps when the communication is started.

On the other hand, in a state illustrated in FIG. 1C, it is assumed that disconnection occurs at a disconnection portion 12X in the middle of the trunk line 12A connecting the zone ECU 41 and the joint connector 14A. Therefore, in the state illustrated in FIG. 1C, communication cannot be performed in the communication path 23 of FIG. 1B.

Therefore, the communication system 100 closes the switch 22-1, and enables use of a new communication path 25 in which the two joint connectors 14A and 14C are connected by the backup line 21-1. Further, the content of the routing maps on the central gateway 11 and the zone ECUs 41 and 42 is automatically rewritten so that the communication path 25 can be used immediately.

As a result, for example, when communication is to be performed between the electrical component 18 on the downstream side of the joint connector 14A and the electrical component 18 on the downstream side of the joint connector 14C in the state illustrated in FIG. 1C, path switching is performed so as to start communication immediately using the communication path 25. That is, the communication is started in the communication path 25 passing through the joint connector 14A, the backup line 21-1, the switch 22-1, the joint connector 14C, the zone trunk line 12C, the joint connector 14B, the zone trunk line 12B, the zone ECU 41, the high-order communication bus 16, and the central gateway 11.

Since the disconnection portion 12X is not used in the communication path 25, occurrence of delay can be avoided. Since the content of the routing maps on the central gateway 11 and the zone ECUs 41 and 42 is rewritten so as to use the communication path 25 by communication between the plurality of electrical components 18, the communication path 25 can be used immediately after the start of the communication.

In the state illustrated in FIG. 1C, since the disconnection portion 12X exists, an entire loop of a path passing through the zone trunk lines 12A, 12B, and 12C is not closed even when the two joint connectors 14A and 14C are connected by the backup line 21-1 and the switch 22-1, and a correct routing map can be created without any problem at the CAN communication standard. The zone on the left side of the vehicle body 10 is also controlled similarly to the zone on the right side.

<Connection State of Zone Trunk Line End>

Figure 2A:
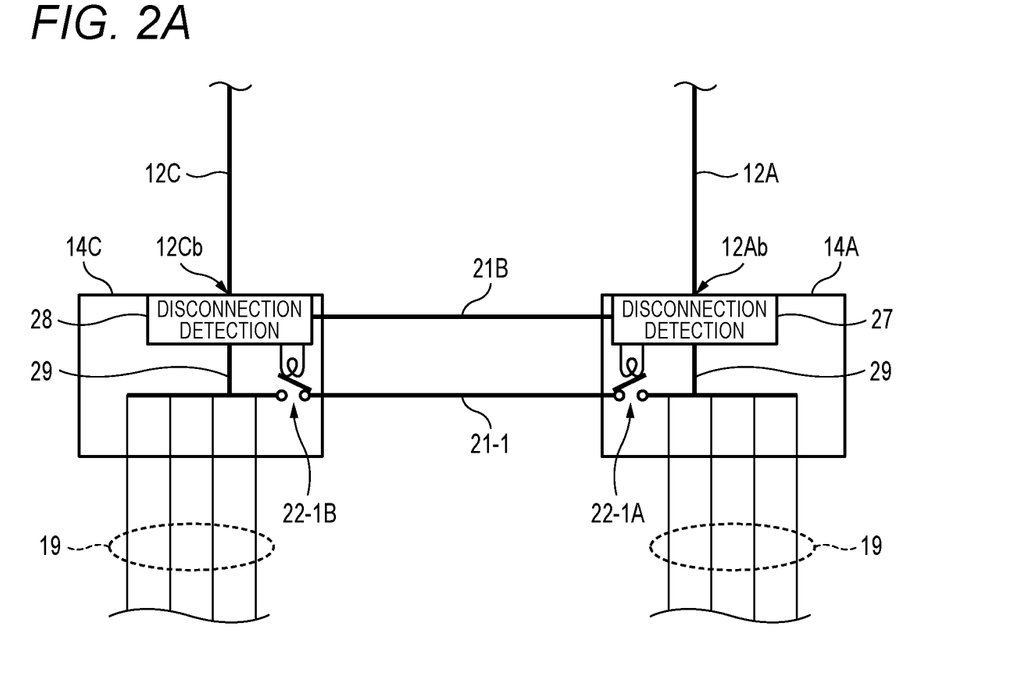
FIG. 2A is an electric circuit diagram illustrating a connection state of a plurality of trunk line ends included in the communication system, specifically illustrating a normal state thereof.
Figure 2B:
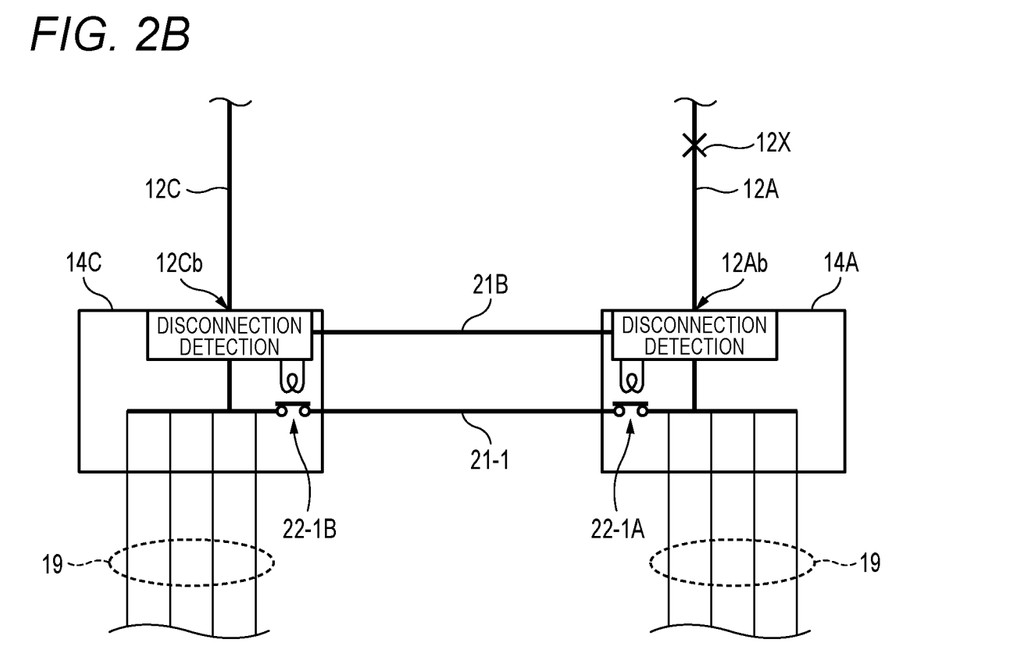
FIG. 2B is an electric circuit diagram illustrating a connection state of the plurality of trunk line ends included in the communication system, specifically illustrating a connected state at the time when disconnection occurs.

Specific examples of connection states of ends 12Ab and 12Cb of the plurality of zone trunk lines 12A and 12C included in the communication system 100 are illustrated in FIGS. 2A and 2B. FIG. 2A illustrates a normal state, and FIG. 2B illustrates a connected state at the time when disconnection occurs.

In the communication system 100, as illustrated in FIGS. 2A and 2B, the end 12Ab of the zone trunk line 12A is connected to the joint connector 14A, and the end 12Cb of the zone trunk line 12C is connected to the joint connector 14C. Further, in the example of FIGS. 2A and 2B, the backup line 21-1 is connected between the two joint connectors 14A and 14C constantly, and switches 22-1A and 22-1B that establish and cut off the connection of the backup line 21-1 are built in the respective joint connectors 14A and 14C. In addition, a disconnection information transmission circuit (electric wire) 21B for transmitting a dedicated signal between the two joint connectors 14A and 14C is provided in parallel with the backup line 21-1.

The end 12Ab of the zone trunk line 12A and a plurality of branch lines 19 are electrically connected by a connection portion 29 inside the joint connector 14A. Similarly, the end 12Cb of the zone trunk line 12C and a plurality of branch lines 19 are electrically connected by the connection portion 29 inside the joint connector 14C. Each of the switches 22-1A and 22-1B establishes and cuts off connection between the backup line 21-1 and the connection portion 29.

In addition, a disconnection detection unit 27 for detecting disconnection of the zone trunk line 12A is provided inside the joint connector 14A, and a disconnection detection unit 28 for detecting disconnection of the zone trunk line 12C is provided inside the joint connector 14C. The disconnection detection unit 27 controls opening and closing of the switch 22-1A. Similarly, the disconnection detection unit 28 controls opening and closing of the switch 22-1B. Upon detecting disconnection, the disconnection detection unit 27 transmits information on the disconnection to the disconnection detection unit 28 via the disconnection information transmission circuit 21B. Similarly, upon detecting disconnection, the disconnection detection unit 28 transmits information on the disconnection to the disconnection detection unit 27 via the disconnection information transmission circuit 21B.

In a state where no disconnection occurs in any of the zone trunk lines 12A and 12C, the switch 22-1A in the joint connector 14A is opened and the switch 22-1B in the joint connector 14C is also opened as illustrated in FIG. 2A, so that the backup line 21-1 is disconnected from the communication path. On the other hand, when disconnection occurs at the disconnection portion 12X of the zone trunk line 12A, the switch 22-1A in the joint connector 14A is closed and the switch 22-1B in the joint connector 14C is also closed as illustrated in FIG. 2B, so that the backup line 21-1 can be used as a communication path between the two joint connectors 14A and 14C.

<Internal Configuration of Joint Connector>

Figure 3:
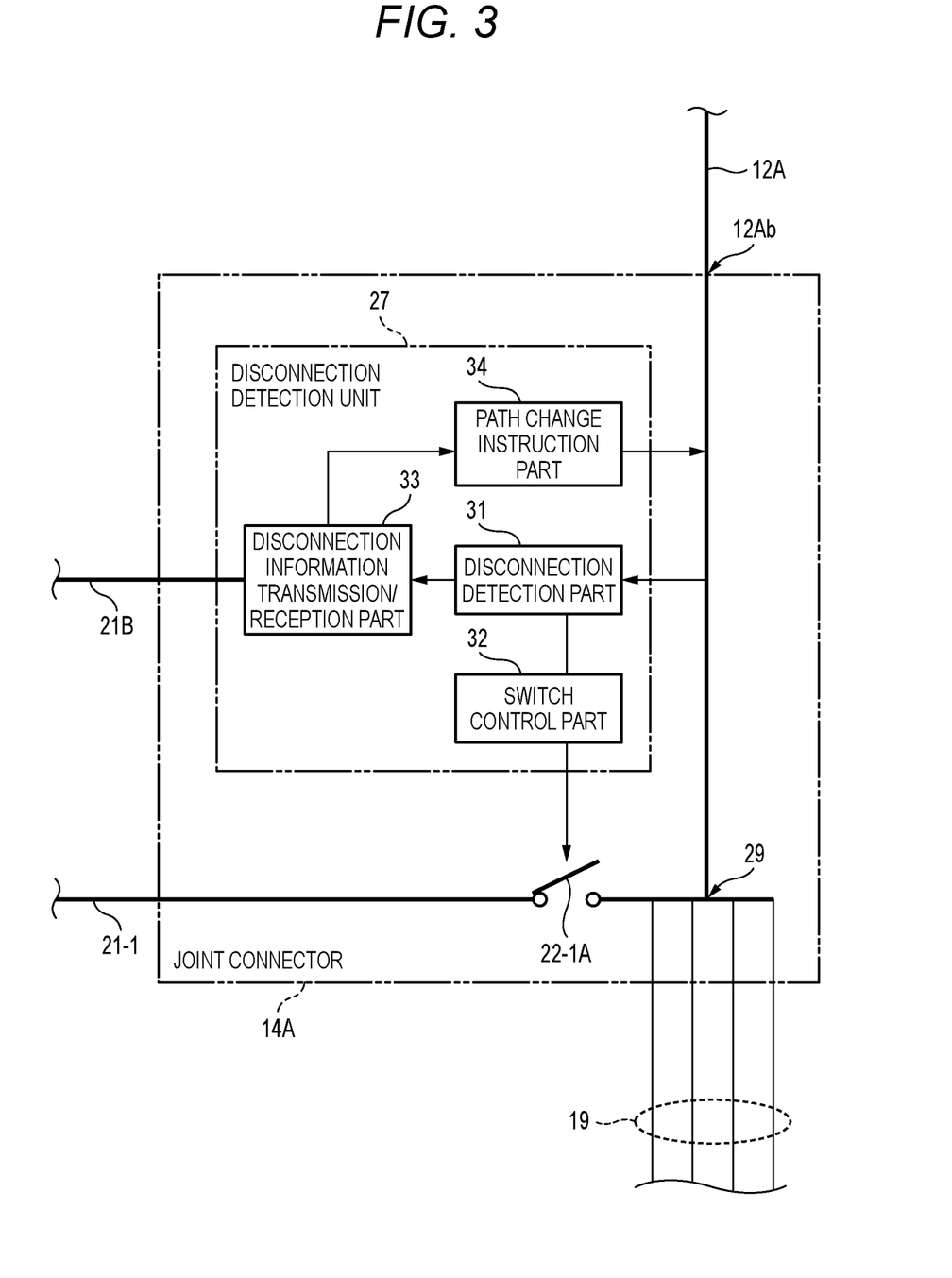
FIG. 3 is a block diagram illustrating a specific example of an internal configuration of a joint connector at one trunk line end.

A specific example of an internal configuration of one joint connector 14A of a zone trunk line end is illustrated in FIG. 3. As illustrated in FIG. 3, the disconnection detection unit 27 in the joint connector 14A includes a disconnection detection part 31, a switch control part 32, a disconnection information transmission/reception part 33, and a path change instruction part 34. The disconnection detection unit 28 in the joint connector 14C has the same configuration as the disconnection detection unit 27.

The disconnection detection part 31 can detect presence or absence of disconnection in the zone trunk line 12A. For example, the disconnection detection part 31 can detect the presence or absence of disconnection by monitoring any one or a combination of a potential difference between two communication lines, a potential of each communication line, presence or absence of change in the potential or potential difference, and impedance between communication lines.

Normally, the switch control part 32 performs control so that the contacts of the switch 22-1A are open, and when disconnection is detected by the disconnection detection part 31, the switch control part 32 switches a state of the switch 22-1A so that the contacts thereof are closed. When disconnection is detected by the disconnection detection part 31 in the disconnection detection unit 27, the disconnection information transmission/reception part 33 transmits disconnection information to the disconnection detection unit 28 on the other side via the disconnection information transmission circuit 21B. In addition, when disconnection is detected by the disconnection detection unit 28 on the other side, the disconnection information transmission/reception part 33 in the disconnection detection unit 27 receives disconnection information transmitted to the disconnection information transmission circuit 21B by the disconnection detection unit 28 and transmits the disconnection information to the path change instruction part 34 therein.

The path change instruction part 34 includes a communication interface of the CAN standard, and transmits information for instructing change of path to the zone ECU 41 or the like by using a communication path of the zone trunk line 12C, in which no disconnection occurs, in accordance with the disconnection information received by the disconnection information transmission/reception part 33.

<State Change of Communication System>

Figure 4:
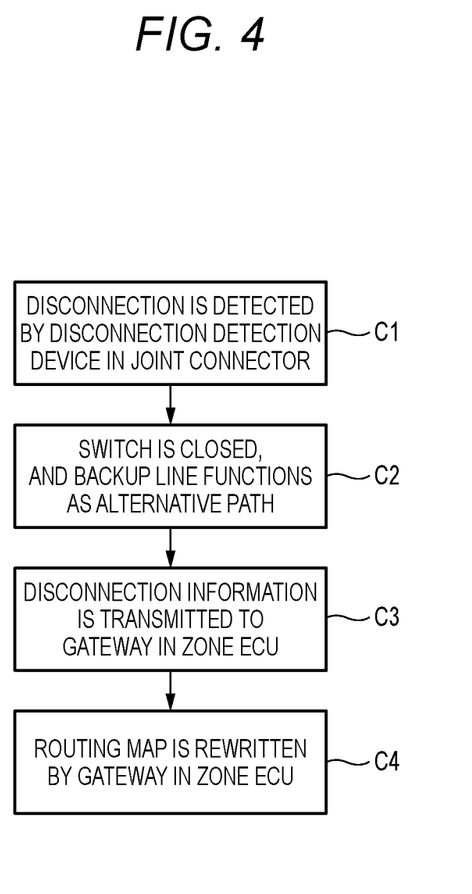
FIG. 4 is a state transition flowchart illustrating a state change of the communication system at the time when disconnection occurs.

A state change of the communication system 100 at the time when disconnection occurs is illustrated in FIG. 4.

For example, when disconnection occurs at the disconnection portion 12X of the zone trunk line 12A, a state C1 in FIG. 4 is established. That is, the disconnection detection part 31 detects the disconnection of the zone trunk line 12A by the disconnection detection unit 27 in the joint connector 14A.

Then, the state is transitioned to a state C2, and the contacts of the switch 22-1A are closed under the control of the switch control part 32. Further, since the contacts of the switch 22-1B are also closed on the disconnection detection unit 28 side, the backup line 21-1 is available as an alternative path.

In a next state C3, the disconnection detection unit 28 that receives disconnection information transmits the disconnection information to the zone ECU 41 or the like serving as a gateway by using a communication path passing through the zone trunk line 12C in which no disconnection occurs.

In a next state C4, by control of a gateway in the zone ECU 41 that receives the disconnection information, that is, a path change instruction from the disconnection detection unit 28, a routing map is automatically rewritten so as to use the path of the backup line 21-1.

<Control Operations of Communication System>

Figure 5:
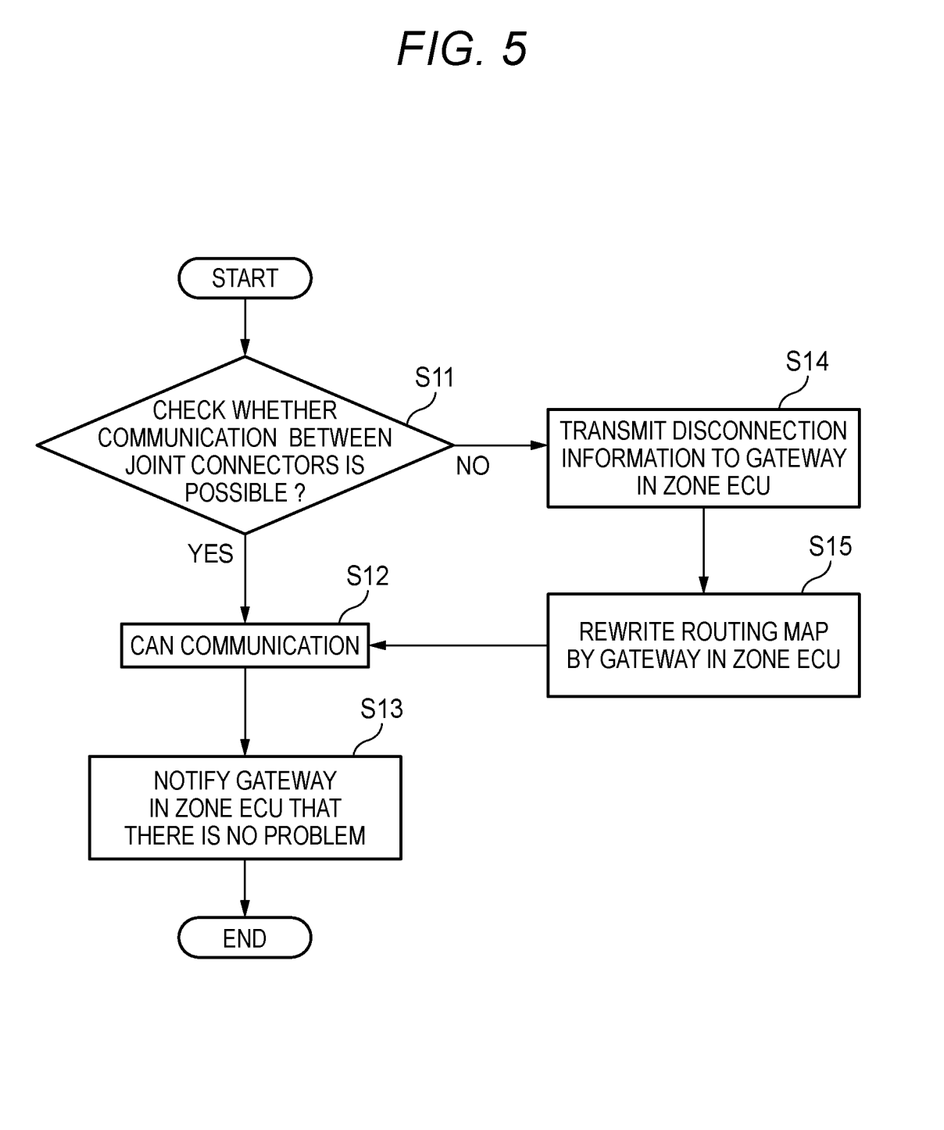
FIG. 5 is a flowchart illustrating control operations of the communication system for coping with the occurrence of disconnection.

Control operations of the communication system 100 for coping with occurrence of disconnection are illustrated in FIG. 5.

The disconnection detection unit 27 or 28 existing in each of the joint connectors 14A to 14C constantly or periodically monitors and checks whether communication paths to the other two joint connectors can be used (electrically connected), and similarly the disconnection detection unit 27 or 28 existing in each of the joint connectors 15A to 15C constantly or periodically monitors and checks whether communication paths to the other two joint connectors can be used (electrically connected) (S11).

When the communication paths can be used without any problem, according to the routing map of the zone ECU 41, the disconnection detection unit 27 or 28 in each of the joint connectors 14A to 14C performs communication of the CAN standard with the zone ECU 41 by using a communication path determined by the zone ECU 41, and similarly according to the routing map of the zone ECU 42, the disconnection detection unit 27 or 28 in each of the joint connectors 15A to 15C performs communication of the CAN standard with the zone ECU 42 by using a communication path determined by the zone ECU 42 (S12).

The disconnection detection unit 27 or 28 in each of the joint connectors 14A to 14C uses the communication of the CAN standard to notify the gateway in the zone ECU 41 that there is no problem in the current communication path, and similarly the disconnection detection unit 27 or 28 in each of the joint connectors 15A to 15C uses the communication of the CAN standard to notify the gateway in the zone ECU 42 that there is no problem in the current communication path (S13).

When the disconnection detection unit 27 or 28 in any of the joint connectors 14A to 14C detects disconnection, the disconnection detection unit 27 or 28 that detects the disconnection transmits generated disconnection information to the gateway 11 in the zone ECU 41, and similarly when the disconnection detection unit 27 or 28 in any of the joint connectors 15A to 15C detects disconnection, the disconnection detection unit 27 or 28 that detects the disconnection transmit generated disconnection information to the gateway 11 in the zone ECU 42 (S14).

When the gateway 11 in the zone ECU 41 receives the disconnection information transmitted from the disconnection detection unit 27 or 28 in any of the joint connectors 14A to 14C, the gateway 11 rewrites the routing map therein, and similarly when the gateway 11 in the zone ECU 42 receives the disconnection information transmitted from the disconnection detection unit 27 or 28 in any of the joint connectors 15A to 15C, the gateway 11 rewrites the routing map therein (S15). Accordingly, the path passing through the disconnection portion 12X is excluded, and assignment of the communication path is changed so as to use the path of the backup line 21-1 instead.

Therefore, in the communication system 100 that performs the control as illustrated in FIG. 5, when a failure such as disconnection at the disconnection portion 12X occurs, the content of the routing map of the zone ECU 41 and/or the zone ECU 42 is switched so as to use an alternative path other than the disconnected path. Therefore, even when disconnection occurs, it is possible to avoid an increase in delay time of communication.

Second Embodiment

<Configuration of Communication System>

Figure 6:
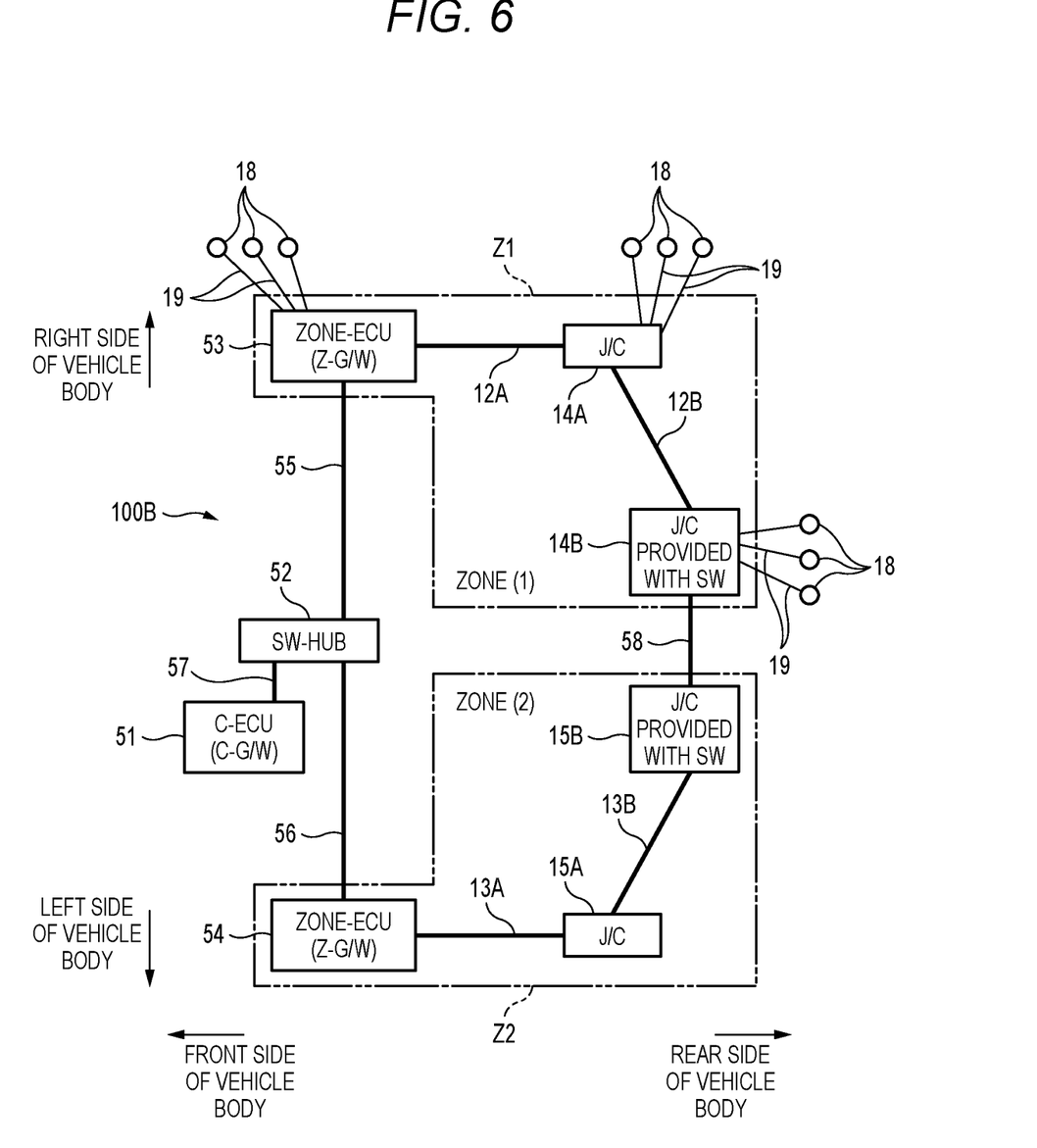
FIG. 6 is a block diagram illustrating a configuration of a communication system according to a second embodiment.

A configuration of a communication system 100B of a second embodiment is illustrated in FIG. 6.

The communication system 100B illustrated in FIG. 6 is used in a state of being mounted on a vehicle body, similarly to the communication system 100 described above. In addition, two separate zones Z1 and Z2 are formed separately in two spaces in a left-right direction of the vehicle body.

The zone Z1 is provided with a zone ECU 53, the zone trunk lines 12A and 12B, and the joint connectors 14A and 14B. The zone trunk line 12A connects a downstream side of the zone ECU 53 and the joint connector 14A, and the zone trunk line 12B connects the two joint connectors 14A and 14B. The joint connector 14B connected to an end of the zone trunk line 12B has a switch (SW) function equivalent to that of the disconnection detection unit 27 described above.

The zone ECU 53 has a function of a gateway (Z-G/W) for controlling a communication path in the zone Z1, and holds a changeable routing map. The electrical components 18 are connected to the downstream side of the zone ECU 53 and downstream sides of the joint connectors 14A and 14B respectively via the branch lines 19.

Transmission paths in the zones Z1 and Z2 are communication networks of the CAN standard, and each disconnection detection unit 27 or 28 in the zone ECUs 53 and 54 and the joint connectors 14B and 15B includes a communication interface corresponding to the CAN.

Meanwhile, an ECU having a function of a central gateway (C-G/W) 51 is connected to one communication port of a switching hub (SW-HUB) 52 via a high-order communication bus 57. One communication port of the switching hub 52 is connected to the zone ECU 53 via a high-order communication bus 55, and another communication port of the switching hub 52 is connected to the zone ECU 54 via a high-order communication bus 56.

Here, a communication network connecting the central gateway 51, the switching hub 52, the high-order communication buses 55, 56, and 57, and the zone ECUs 53 and 54 forms a transmission path of the Ethernet (registered trademark) standard. Accordingly, the central gateway 51 and each of the zone ECUs 53 and 54 incorporate a communication interface corresponding to the Ethernet.

In the communication system 100B of FIG. 6, an inter-zone backup line 58 connects the joint connector 14B of the zone Z1 and the joint connector 15B of the zone Z2. Accordingly, in the communication system 100B, the zone trunk lines 12B and 12A, the high-order communication buses 55 and 56, the zone trunk lines 13A and 13B, and the inter-zone backup line 58 are configured to form one loop.

Switches like the disconnection detection units 27 and 28 are built in the joint connector 14B at the end of the zone trunk line 12B and the joint connector 15B at an end of the zone trunk line 13B respectively, and these switches are normally open. Thus, the inter-zone backup line 58 is normally disconnected from the path and a part of the loop is open.

Therefore, normally, the communication paths of the two zones Z1 and Z2 are independent from each other. When disconnection occurs, a new communication path across the two zones Z1 and Z2 can be used by performing switching to connect the joint connectors 14B and 15B with the inter-zone backup line 58.

<Operation Procedure of Failure Detection>

Figure 7:
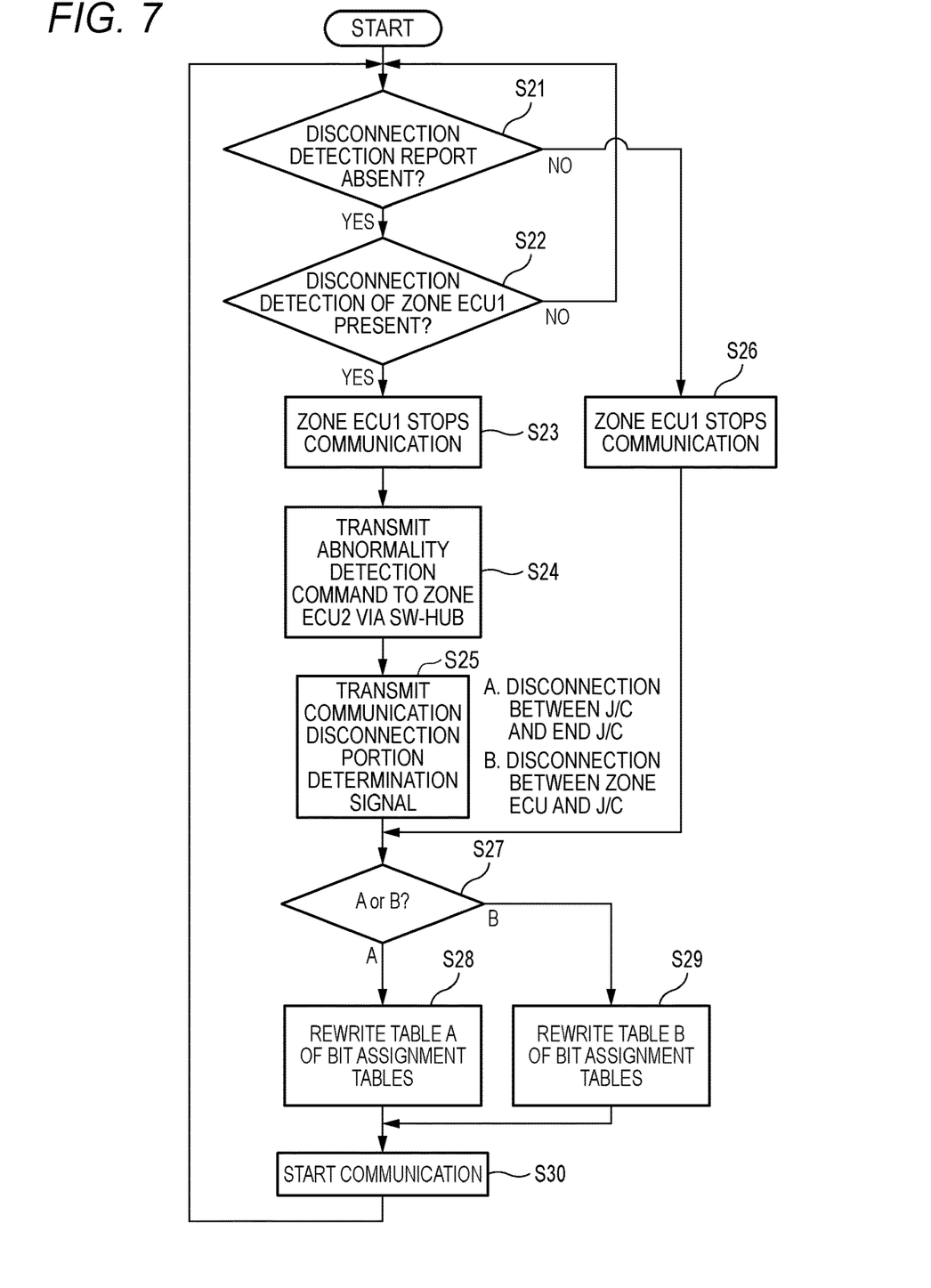
FIG. 7 is a flowchart illustrating an operation procedure of failure detection in the second embodiment.

An operation procedure of failure detection in the second embodiment is illustrated in FIG. 7.

The operation procedure of FIG. 7 is a procedure for coping with disconnection in one zone Z1. The zone ECU 53 is an ECI 1, the zone ECU 54 is an ECU 2, and the zone ECU 53 also has a disconnection detecting function. In addition, disconnection in the zone trunk line 12B between the joint connector 14A in the middle of an in-zone path and the joint connector 14B at an end thereof is referred to as "disconnection pattern A", and disconnection in the zone trunk line 12A between the zone ECU 53 and the joint connector 14A is referred to as "disconnection pattern B". The operation procedure of FIG. 7 will be described below.

The zone ECU 53 checks in step S21 presence or absence of a disconnection detection report from the disconnection detection unit 27 or the like included in the joint connector 14B in the zone Z1. In addition, the zone ECU 53 checks in step S22 whether the zone ECU 53 itself detects disconnection in the zone Z1. If no disconnection occurs, the processes of S21 and S22 are repeated.

When disconnection of the "disconnection pattern A" occurs, information transmitted by the disconnection detection unit 27 in the joint connector 14B can be delivered to the zone ECU 53 via the inter-zone backup line 58, the zone Z2, and the high-order communication buses 56 and 55. In this case, the zone ECU 53 recognizes the "disconnection pattern A" and stops communication in the zone Z1 in a subsequent step S26.

When disconnection of the "disconnection pattern B" occurs, the zone ECU 53 itself recognizes the "disconnection pattern B" in S22, and stops communication in the zone Z1 in a next step S23. Further, in step S24, the zone ECU 53 transmits an abnormality detection command to the central gateway 51 and the zone ECU 54 by using communication of a path passing through the high-order communication bus 55 and the switching hub 52. In practice, the zone ECU 53 transmits disconnection detection information to the central gateway 51, and the central gateway 51 that receives this information transmits an abnormality detection command with respect to the zone ECU 54 so as to appropriately rewrite a routing map.

When disconnection occurs, each of the zone ECU 53, the central gateway 51, and the zone ECU 54 rewrites a routing map therein. In practice, a plurality of groups of path information determined in advance for each occurrence of disconnection and each disconnection portion is prepared as tables of bit assignment tables on each routing map, and that which table of a plurality of groups is to be selected by the routing map means rewriting of the routing map.

Each of the zone ECU 53, the central gateway 51, and the zone ECU 54 checks whether the current disconnection is the "disconnection pattern A" or the "disconnection pattern B" in step S27. Further, in a case of the "disconnection pattern A", a "table A" of the bit assignment tables is selected and the routing map is rewritten accordingly in step S28. In a case of the "disconnection pattern B", a "table B" of the bit assignment tables is selected and the routing map is rewritten accordingly in step S29.

After rewriting of the routing map is completed, in step S30, the zone ECU 53 starts communication in the zone Z1. In this case, since a path that does not pass through a portion where the disconnection occurs is assigned from the beginning to the content of the routing map to be used, effects of the disconnection can be avoided before the communication, and occurrence of delay is prevented.

In a general communication network, since it is not determined in advance what device is to be connected to each node position of the network, a routing map cannot be determined in advance. However, in a case of the on-vehicle communication system 100, since it is determined in advance which electrical component is connected to each node position of a wire harness that forms a transmission path of a network, content of a routing map to be used by a gateway can also be determined in advance.

Third Embodiment

Figure 8:
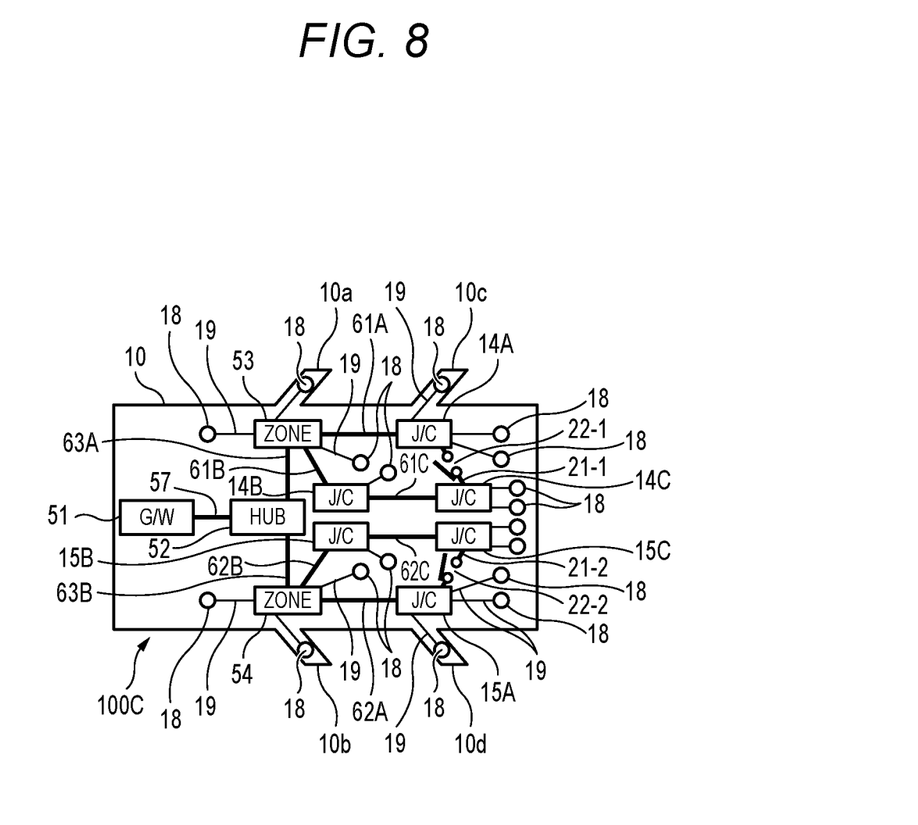
FIG. 8 is a block diagram illustrating a configuration of a communication system according to a third embodiment.

A configuration of a communication system 100C of a third embodiment is illustrated in FIG. 8.

In the communication system 100C illustrated in FIG. 8, the central gateway 51, the switching hub (HUB) 52, the zone ECUs 53 and 54, high-order communication buses 63A and 63B, the joint connectors 14A to 14C and 15A to 15C, zone trunk lines 61A, 61B, 61C, 62A, 62B and 62C, and the backup lines 21-1 and 21-2 are connected on communication paths.

In a zone on the right side of a vehicle body, the zone trunk lines 61A, 61B and 61C, and the backup line 21-1 are connected so as to form one closed loop. The zone ECU 53 controls a communication path of this zone. The switch 22-1 is connected in the middle of a path of the backup line 21-1. The switch 22-1 is a normally-off type switch that opens a circuit in a steady state, and is a switch capable of on-off control, such as a relay. Therefore, in the steady state, a part of the loop of an in-zone communication path is opened, and the backup line 21-1 is disconnected from a CAN bus.

In a zone on the left side of the vehicle body, the zone trunk lines 62A, 62B and 62C, and the backup line 21-2 are connected so as to form one closed loop. The zone ECU 54 controls a communication path of this zone. The switch 22-2 is connected in the middle of a path of the backup line 21-2. The switch 22-2 is a normally-off type switch that opens a circuit in a steady state, and is a switch capable of on-off control, such as a relay. Therefore, in the steady state, a part of the loop of an in-zone communication path is opened, and the backup line 21-2 is disconnected from a CAN bus.

Meanwhile, an ECU having a function of the central gateway (G/W) 51 is connected to one communication port of the switching hub (HUB) 52 via the high-order communication bus 57. One communication port of the switching hub 52 is connected to the zone ECU 53 via the high-order communication bus 63A, and another communication port of the switching hub 52 is connected to the zone ECU 54 via the high-order communication bus 63B.

Here, a communication network connecting the central gateway 51, the switching hub 52, the high-order communication buses 63A and 63B, and the zone ECUs 53 and 54 forms a transmission path of the Ethernet (registered trademark) standard. Accordingly, the central gateway 51 and each of the zone ECUs 53 and 54 incorporate a communication interface corresponding to the Ethernet.

In the communication system 100C of FIG. 8, for example, when disconnection occurs in the middle of the zone trunk line 61A in the zone on the right side of the vehicle body, a path passing through the backup line 21-1 and the zone trunk lines 61C and 61B can be used as a communication path connecting the zone ECU 53 and the joint connector 14A, instead of the zone trunk line 61A. In this case, since a disconnection detection unit in the zone ECU 53 or the joint connector 14A detects the disconnection and rewrites a routing map in the zone ECU 53, it is possible to avoid an increase in delay time without being affected by a disconnected portion. In addition, the zone ECU 53 transmits information indicating the rewriting of the routing map to the central gateway 51 via the switching hub 52. The central gateway 51 transmits a control signal to the zone ECU 54 as necessary. The same applies to the zone on the left side of the vehicle body.

Although it is assumed in any of the above-described embodiments that the communication paths are switched only when the wire harness of the communication line is disconnected, it is conceivable to switch the paths even in a condition other than disconnection. For example, in cases such as one where a communication load is increased, one where impedance of the communication line is changed, or one where communication noise is increased, communication quality decreases. That is, since occurrence frequency of an error is increased, and a decrease in communication speed and an increase in delay time are predicted, it is desirable to switch the communication paths in the same manner as in the case of disconnection. Therefore, the decrease in communication quality can be treated equivalently to the occurrence of disconnection.

<Advantages of Communication System 100>

According to the communication system 100 illustrated in FIGS. 1A to 1C, the space or the like on the vehicle can be divided into a plurality of zones, and the communication path can be controlled independently for each zone. Further, since the communication path of each zone is formed in a loop form, when disconnection occurs in a part of the communication path, it is possible to secure a new path to perform communication by connecting the backup line 21-1 or 21-2 with the switch 22-1 or 22-2. Further, since the routing maps of the zone ECUs 41 and 42 and the central gateway 11 are automatically rewritten by the control illustrated in FIGS. 4 and 5 or the like when disconnection occurs, it is possible to preferentially select a path that does not pass through a disconnected path, thereby avoiding an increase in delay time.

Further, according to the communication system 100B illustrated in FIG. 6, even if the path of each of the zones Z1 and Z2 does not form a loop, when disconnection occurs in any of the zones Z1 and Z2, a new path across the multiple zones Z1 and Z2 can be formed by connecting the inter-zone backup line 58, thereby securing a necessary communication path. Moreover, since the routing maps on the zone ECUs 53 and 54 and the central gateway 51 are automatically rewritten by control as illustrated in FIG. 7 following disconnection detection, the path of the inter-zone backup line 58 can be used immediately for any of the multiple zones Z1 and Z2, and an increase in delay time can be avoided.

According to the communication system 100C illustrated in FIG. 8, the zones thereof can be configured similarly to those of the communication system 100 illustrated in FIGS. 1A to 1C, these zones can be connected to each other via a high-speed transmission path such as one of the Ethernet standard, and the zone ECUs 41 and 42 can be linked to each other.

A communication system according to an embodiment has a plurality of communication lines each formed in a loop form and in which a transmission path having a coupling connector provided at each of a plurality of connection positions on the communication line is formed in each of a plurality of zones. The communication system includes:
 a plurality of zone management parts (zone ECUs 41 and 42) each of which manages a communication path of one of the plurality of zones;
 a central management part (central gateway 11) that manages all communication paths in the plurality of zones in cooperation with the plurality of zone management parts;
 one or more path switches (switches 22-1 and 22-2) that are provided for each of the plurality of zones;
 two or more disconnection detection parts (disconnection detection units 27 and 28) that are provided for each of the plurality of zones; and
 a communication path control part (disconnection detection units 27 and 28 and zone ECUs 41 and 42).

The path switch is controllable to cut off a part of the communication line in a steady state is provided inside or near the plurality of the coupling connectors (joint connectors 14A and 14C),
 in which the disconnection detection part that detects presence or absence of disconnection in one or more paths included in the communication line for each of the plurality of zones is provided inside or near the plurality of the coupling connectors,
 in which each of the plurality of zone management parts and the central management part holds a routing map for controlling the communication path, and
 in which when the disconnection detection part detects presence of disconnection, the communication path control part switches one or a plurality of the path switches to a connected state, and changes content of the routing map to enable use of a path passing through the path switch (see FIGS. 4 and 5).

According to the communication system having the above configuration, since the communication line is formed in a loop form, when a failure such as disconnection occurs on the communication line, another path can be used. At this time, since the path switch cuts off a part of the communication line in a steady state, a part of the loop is opened in an actual path. Therefore, even when the communication line is a bus-type communication network such as a CAN, the routing map can be created without any problem. In addition, when disconnection occurs, a path different from the disconnected path can be secured by closing the path switch, so that communication is possible. Further, when the disconnection detection part detects the disconnection, the communication path control part changes the content of the routing map and enables use of the path passing through the path switch, so that communication delay can be reduced. That is, since the communication can be started by selecting from the beginning a backup path different from the disconnected path, it is possible to prevent an increase in delay time. Further, since each of the plurality of zones is managed by a plurality of zone management parts, independent communication control can be performed for each zone. Further, in a case where disconnection occurs, since the plurality of zone management parts cooperate with the central management part to change routing maps thereof, the occurrence of delay can be prevented even when communication is performed in a path across a plurality of zones.

In the communication system, the communication line of each of the plurality of zones may include a first trunk line (zone trunk line 1 A), a second trunk line (zone trunk line 12C), and a backup line (21-1),
 in which a first coupling connector (joint connector 14A) may be connected to an end of the first trunk line,
 in which a second coupling connector (joint connector 14C) may be connected to an end of the second trunk line,
 in which the backup line may be connected between the first coupling connector and the second coupling connector, and
 in which the path switch (switches 22-1 and 22-2) that turns on and off a connected state of the backup line may be provided in at least one of the first coupling connector and the second coupling connector.

According to the communication system having the above configuration, since a path connecting the first trunk line, the first coupling connector, the backup line, the second coupling connector, and the second trunk line is formed, a communication path in a loop form can be formed. At this time, since the path switch cuts off the connection of the backup line in the steady state, the actual path does not form a loop. However, since an entire communication path including the path switch is in a loop form, for example, when disconnection occurs on the first trunk line, communication can be performed by using a path that passes both the backup line and the second trunk line. When disconnection occurs on the second trunk line, communication can be performed by using a path that passes both the backup line and the first trunk line.

In the communication system, a first zone management part (zone ECU 41) that manages the communication path of a first zone (zone Z1) and a second zone management part (zone ECU 42) that manages the communication path of a second zone (zone Z2) may be connected to the central management part,
 in which a first coupling connector (joint connector 14B) may be connected to the communication line (zone trunk lines 12A and 12B) of the first zone, in which a second coupling connector (joint connector 15B) may be connected to the communication line (zone trunk lines 13A and 13B) of the second zone,
in which an inter-zone backup line (58) that is connected between the first coupling connector and the second coupling connector via the path switch may be provided, and
in which when disconnection is detected in the communication path of the first zone, the communication path control part may connect the inter-zone backup line, and may transmit disconnection detection information to the central management part from the first zone to instruct the central management part to change the routing map of the second zone management part (see FIG. 7).

According to the communication system having the above configuration, when disconnection of the communication path occurs in the first zone or the second zone, the first zone and the second zone are connected by the inter-zone backup line, whereby a communication path in a loop form in which the two zones are combined can be formed. However, since the path switch cuts off the connection of the inter-zone backup line in the steady state, the actual path does not form a loop. However, since the entire communication path including the path switch is in a loop form, for example, when disconnection occurs in the first zone, communication is possible by using a path that passes both the inter-zone backup line and the communication path in the second zone. When disconnection occurs in the second zone, communication can be performed by using a path that passes both the inter-zone backup line and the communication path in the first zone. Since the central management part instructs to change the routing map of the second zone management part when disconnection occurs in the first zone, not only the first zone management part but also the second zone management part can grasp a new communication path between the zones passing through the inter-zone backup line, and occurrence of delay in the case of using the communication path can be prevented.

In the communication system, the first coupling connector may be provided with a first path switch and a first disconnection detection part,
in which the second coupling connector may be provided with a second path switch and a second disconnection detection part, and
in which when one of the first disconnection detection part and the second disconnection detection part detects disconnection of the communication line in the first zone or disconnection of the communication line in the second zone, the communication path control part may switch both the first path switch and the second path switch to a state in which the inter-zone backup line is connected (see FIG. 2).

According to the communication system having the above configuration, disconnection in the first zone can be detected by the first disconnection detection part, and disconnection in the second zone can be detected by the second disconnection detection part. Further, it is possible to switch on and off the connection between the communication line of the first zone and the inter-zone backup line by using the first path switch, and to switch on and off the connection between the communication line in the second zone and the inter-zone backup line by using the second path switch. In addition, since there are two path switches, the inter-zone backup line can be connected to an end of the communication line in the first zone or to an end of the communication line in the second zone.

In the communication system, the first disconnection detection part (disconnection detection unit 27) may include a first disconnection transmission part (disconnection information transmission/reception part 33) that transmits disconnection detection information to the second coupling connector and the zone management part, and
in which the second disconnection detection part (disconnection detection unit 28) may include a second disconnection transmission part (disconnection information transmission/reception part 33) that transmits disconnection detection information to the first coupling connector and the zone management part.

According to the communication system having the above configuration, when the communication line in the first zone is disconnected, the second path switch can be closed in response to the disconnection detection information transmitted by the first disconnection transmission part, and further the routing map can be automatically changed. Further, when the communication line in the second zone is disconnected, the first path switch can be closed in response to the disconnection detection information transmitted by the second disconnection transmission part, and further the routing map can be automatically changed.

According to the communication system of the present invention, communication paths can be managed in zones independently, and when a failure such as disconnection of a communication path occurs, another communication path that is not disconnected can be used, and further communication delay can be reduced.

What is claimed is:

1. A communication system that has a plurality of communication lines each formed in a loop form and in which a transmission path having a coupling connector provided at each of a plurality of connection positions on the communication line is formed in each of a plurality of zones, the communication system comprising:
a plurality of zone management parts each of which manages a communication path of one of the plurality of zones;
a central management part that manages all communication paths in the plurality of zones in cooperation with the plurality of zone management parts;
one or more path switches that are provided for each of the plurality of zones;
two or more disconnection detection parts that are provided for each of the plurality of zones; and
a communication path control part,
wherein the path switch that is controllable to cut off a part of the communication line in a steady state is provided inside or near the plurality of the coupling connectors,
wherein the disconnection detection part that detects presence or absence of disconnection in one or more paths included in the communication line for each of the plurality of zones is provided inside or near the plurality of the coupling connectors,
wherein each of the plurality of zone management parts and the central management part holds a routing map for controlling the communication path,
wherein when the disconnection detection part detects presence of disconnection, the communication path control part switches one or a plurality of the path switches to a connected state, and changes content of the routing map to enable use of a path passing through the path switch,
wherein a first zone management part that manages the communication path of a first zone and a second zone management part that manages the communication path of a second zone are connected to the central management part, wherein a first coupling connector is connected to the communication line of the first zone, wherein a second coupling connector is connected to the communication line of the second zone, wherein an inter-zone backup line that is connected between the first coupling connector and the second coupling connector via the path switch is provided, and wherein when disconnection is detected in the communication path of the first zone, the communication path control part connects the inter-zone backup line, and transmits disconnection detection information to the central management part from the first zone to instruct the central management part to change the routing map of the second zone management part.

2. The communication system according to claim 1, wherein the communication line of each of the plurality of zones includes a first trunk line, a second trunk line, and a backup line, wherein the first coupling connector is connected to an end of the first trunk line, wherein the second coupling connector is connected to an end of the second trunk line, wherein the backup line is connected between the first coupling connector and the second coupling connector, and wherein the path switch that turns on and off a connected state of the backup line is provided in at least one of the first coupling connector and the second coupling connector.

3. The communication system according to claim 1, wherein the first coupling connector is provided with a first path switch and a first disconnection detection part, wherein the second coupling connector is provided with a second path switch and a second disconnection detection part, and wherein when one of the first disconnection detection part and the second disconnection detection part detects disconnection of the communication line in the first zone or disconnection of the communication line in the second zone, the communication path control part switches both the first path switch and the second path switch to a state in which the inter-zone backup line is connected.

4. The communication system according to claim 3, wherein the first disconnection detection part includes a first disconnection transmission part that transmits disconnection detection information to the second coupling connector and the zone management part, and wherein the second disconnection detection part includes a second disconnection transmission part that transmits disconnection detection information to the first coupling connector and the zone management part.

* * * * *